(12) United States Patent
Pettey

(10) Patent No.: US 7,795,768 B2
(45) Date of Patent: *Sep. 14, 2010

(54) MECHANISMS AND GEARS FOR ATTACHMENT TO A HOBBY SERVO OUTPUT SHAFT

(75) Inventor: Brian Pettey, Winfield, KS (US)

(73) Assignee: BTR Robotics Limited Liability Company, Winfield, KS (US)

( * ) Notice: Subject to any disclaimer, the term of this patent is extended or adjusted under 35 U.S.C. 154(b) by 183 days.

This patent is subject to a terminal disclaimer.

(21) Appl. No.: 12/187,698

(22) Filed: Aug. 7, 2008

(65) Prior Publication Data

US 2009/0066176 A1    Mar. 12, 2009

Related U.S. Application Data

(60) Provisional application No. 60/964,124, filed on Aug. 9, 2007.

(51) Int. Cl.
*H02K 5/00* (2006.01)
(52) U.S. Cl. ...................... 310/75 R; 310/83
(58) Field of Classification Search ............... 310/75 R, 310/83, 92, 98, 99, 91; 74/89.2, 89.21, 89.22, 74/96, 100.2, 108, 425, 427, 434, 522
See application file for complete search history.

(56) References Cited

U.S. PATENT DOCUMENTS

| 5,138,211 | A  | * | 8/1992  | Haefner et al. | 310/78   |
|-----------|----|---|---------|----------------|----------|
| 5,492,024 | A  | * | 2/1996  | Siner          | 74/89.22 |
| 6,223,615 | B1 | * | 5/2001  | Huck           | 74/425   |
| 7,270,589 | B1 | * | 9/2007  | Brown et al.   | 446/317  |
| 7,285,884 | B2 | * | 10/2007 | Pettey         | 310/75 R |
| 7,336,009 | B2 | * | 2/2008  | Pettey         | 310/75 R |
| 7,501,731 | B2 | * | 3/2009  | Pettey         | 310/75 R |
| 7,559,129 | B2 | * | 7/2009  | Pettey         | 29/401.1 |
| 7,559,822 | B2 | * | 7/2009  | Byers          | 446/461  |
| 7,671,497 | B2 | * | 3/2010  | Pettey         | 310/75 R |

* cited by examiner

*Primary Examiner*—Tran N Nguyen
(74) *Attorney, Agent, or Firm*—Westman, Champlin & Kelly, P.A.

(57) ABSTRACT

Embodiments of hobby servo motor devices are disclosed. Embodiments include a hobby servo motor having an output shaft and a planar surface that is perpendicular to the output shaft. Embodiments also include a gear attachment mechanism having a top planar surface, a bottom planar surface, and an outer surface having gear engaging teeth. The gear engaging teeth extend from the bottom surface to the top surface. The top surface is in contact with the hobby servo output shaft. The gear attachment mechanism bottom planar surface is flushly engaged to the hobby servo planar surface.

18 Claims, 6 Drawing Sheets

MECHANISMS AND GEARS FOR ATTACHMENT TO A HOBBY SERVO OUTPUT SHAFT

REFERENCE TO RELATED CASE

The present application claims priority of U.S. provisional patent application Ser. No. 60/964,124, filed Aug. 9, 2007, the content of which is hereby incorporated by reference in its entirety.

BACKGROUND

The present invention generally pertains to the hobby-mechanical industry. More specifically, the present invention pertains to mechanisms and gears for attachment to a hobby servo output shaft.

A servo motor (a.k.a. simply a "servo") is a device having a rotatable output shaft. The output shaft can typically be positioned to specific angular positions in accordance with a coded signal received by the servo. It is common that a particular angular position will be maintained as long as a corresponding coded signal exists on an input line. If the coded signal changes, the angular position of the shaft will change accordingly. Control circuits and a potentiometer are typically included within the servo motor casing and are functionally connected to the output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

There are different types of servos that include output shafts having varying rotational and torque capabilities. For example, the rotational and/or torque capability of an industrial servo is typically less restricted than that of a hobby servo. That being said, hobby servos are generally available commercially at a cost that is much less than that associated with industrial servos.

Because hobby servos are relatively small and inexpensive, they are popular within the hobby-mechanical industry for applications such as, but by no means limited to, hobby robotic applications and radio-controlled models (cars, planes, boats, etc.). One example of a hobby servo is the Futaba S-148 available from Futaba Corporation of America located in Schaumburg, Ill.

Typically, the output shaft of a hobby servo is not particularly durable. The output shaft is also limited by its relatively small size and gear teeth configuration to engaging a very limited range of mechanical components.

SUMMARY

Embodiments of hobby servo motor devices are disclosed. Embodiments include a hobby servo motor having an output shaft and a planar surface that is perpendicular to the output shaft. Embodiments also include a gear attachment mechanism having a top planar surface, a bottom planar surface, and an outer surface having gear engaging teeth. The gear engaging teeth extend from the bottom surface to the top surface. The top surface is in contact with the hobby servo output shaft. The gear attachment mechanism bottom planar surface is flushly engaged to the hobby servo planar surface.

DETAILED DESCRIPTION

Figure 1:
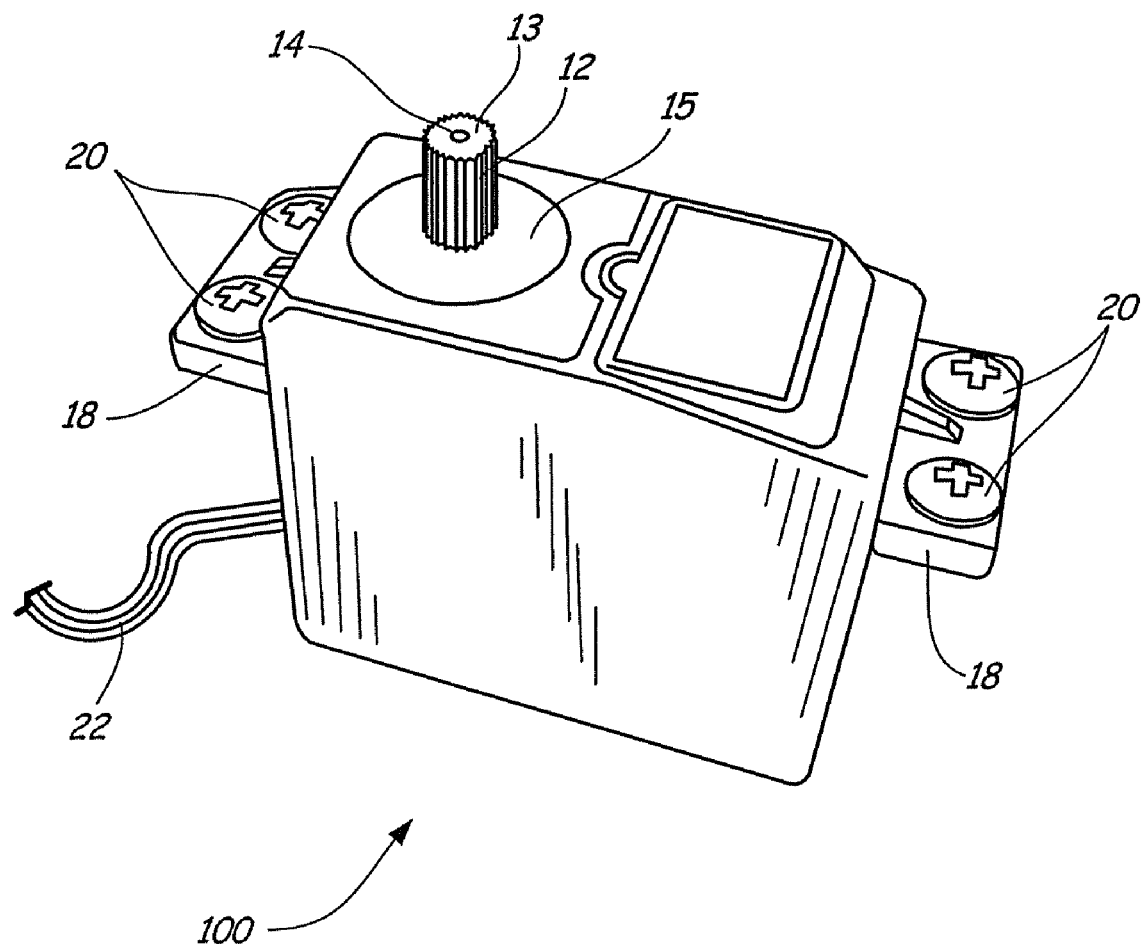
FIG. 1 is a perspective view of an exemplary hobby servo.

Certain embodiments described herein are intended for implementation in association with a motor such as, but not limited to, a hobby servo motor, or more simply stated, a hobby servo. FIG. 1 is a perspective view of one example of a suitable hobby servo 100. Hobby servo 100 can be any type of hobby servo and is not limited in terms of its style, capacity, motor speed, or load carrying capability.

Hobby servo 100 is not intended to suggest any limitation as to the scope of use or functionality of the claimed subject matter. Neither should hobby servo 100 be interpreted as having any dependency or requirement relating to any one or combination of illustrated components.

Hobby servo 100 includes a rotatable splined output shaft 12, rotable splined shaft output top 13, threaded orifice 14, circular planar surface 15, a pair of flanges 18, mounting screws 20, and an electrical cable 22. Splined output shaft 12 has teeth (or ridges) distributed around the outside surface of the output shaft. This configuration is described as a "male" spline configuration. Standard configurations of hobby servos have 23, 24, or 25 teeth. Threaded orifice 14 extends into splined output shaft 12 and is adapted to receive an attachment screw (not shown). Flanges 18 are adapted to receive mounting screws 20. Flanges 18 and screws 20 are adapted to work in combination to mount hobby servo 100 in an operating environment. Electrical cable 22 is attached to the hobby servo 100 and provides electrical power and/or electrical signals to cause the output shaft 12 to rotate in a counter-clockwise or clockwise direction.

Figure 2:
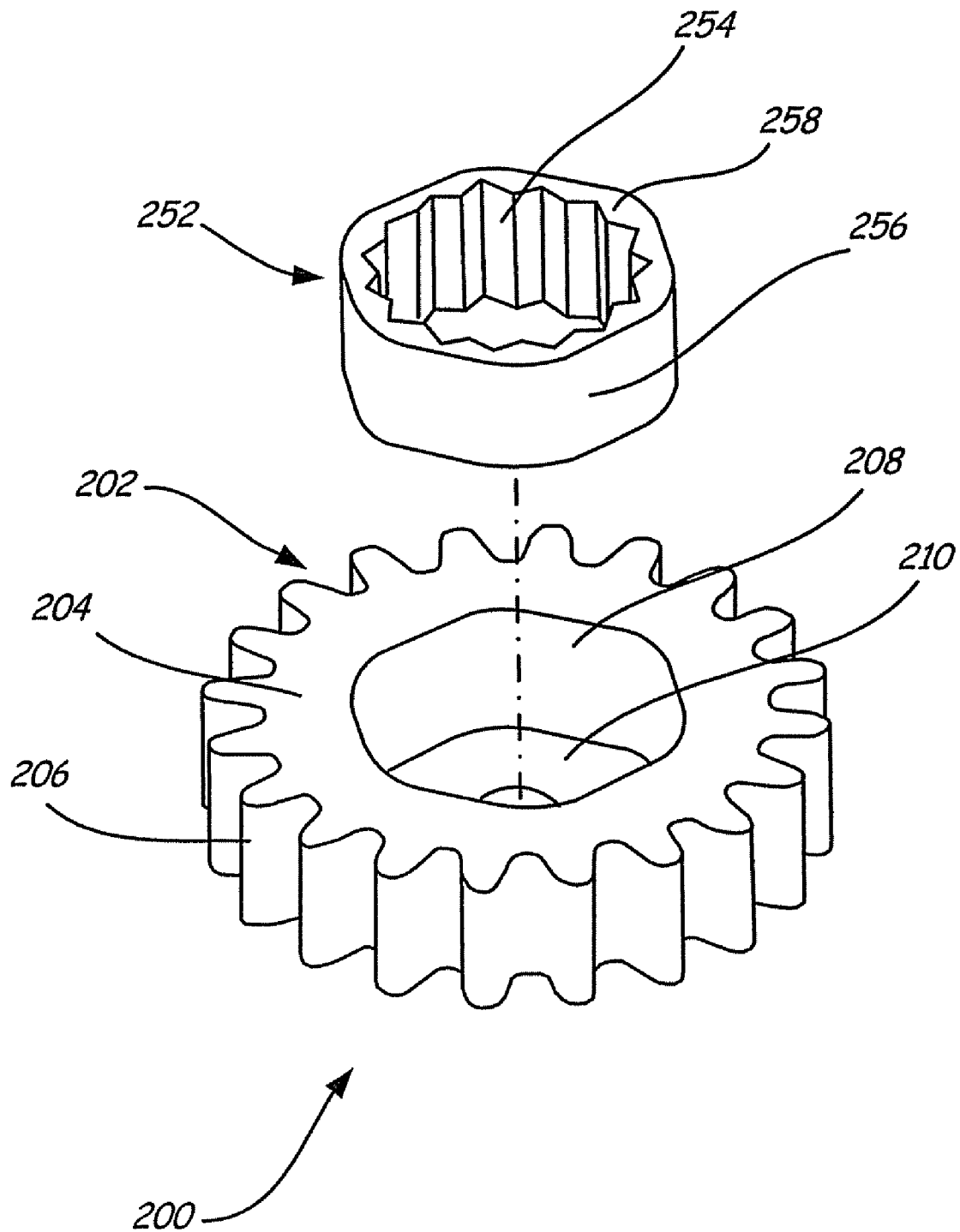
FIG. 2 is an exploded perspective view of a gear assembly.

FIG. 2 is an exploded perspective view of a gear assembly 200. Gear assembly 200 includes an outer gear assembly portion 202 (hereinafter "OGAP 202") and an inner gear assembly portion 252 (hereinafter "IGAP 252").

OGAP 202 includes a bottom surface 204, a teeth surface 206, a circumferential inner surface 208, and a planar inner surface 210. Teeth surface 206 includes mechanical features such as, but not limited to, teeth or ridges that functionally engage mechanisms such as gears, sprockets, chains, belts, propellers, impellers, robot arms, or any other item. Embodiments of teeth surface 206 have any number of teeth such as 0, 16, 20, or 25 teeth. Embodiments of teeth surface 206 also have mechanical features such as teeth of every size, shape, and circumferential distance.

Embodiments of circumferential inner surface 208 include any number of sides such as six. In some embodiments the sides come together at sharp angles. In other embodiments the sides come together at rounded corners. In yet other embodiments, inner surface 208 is cylindrical and includes no sides.

Embodiments of OGAP 202 are made of any material. Some embodiments are made of rigid materials such as steel, copper, and nylon.

IGAP 252 includes a spline receiving surface 254, an outer surface 256, and a bottom surface 258. In an embodiment, spline receiving surface 254 includes a plurality of surfaces that securely engage the teeth (or ridges) of the rotable splined output shaft 12. Embodiments of spline receiving surface 254 include any number of surfaces and any surface shapes.

Embodiments of outer surface 256 include any number of sides such as six. In some embodiments the sides come together at sharp angles. In other embodiments the sides come together at rounded corners. In yet other embodiments, outer surface 256 is cylindrical and includes no sides.

Embodiments of IGAP 252 have dimensions and are shaped such that they fit securely within embodiments of OGAP 202. Embodiments of IGAP 252 are made of any material. Some embodiments are made of plastic, rubber, and metal. In an embodiment, IGAP 252 is laser cut from plastic and press-fit into OGAP 202.

Figure 3:
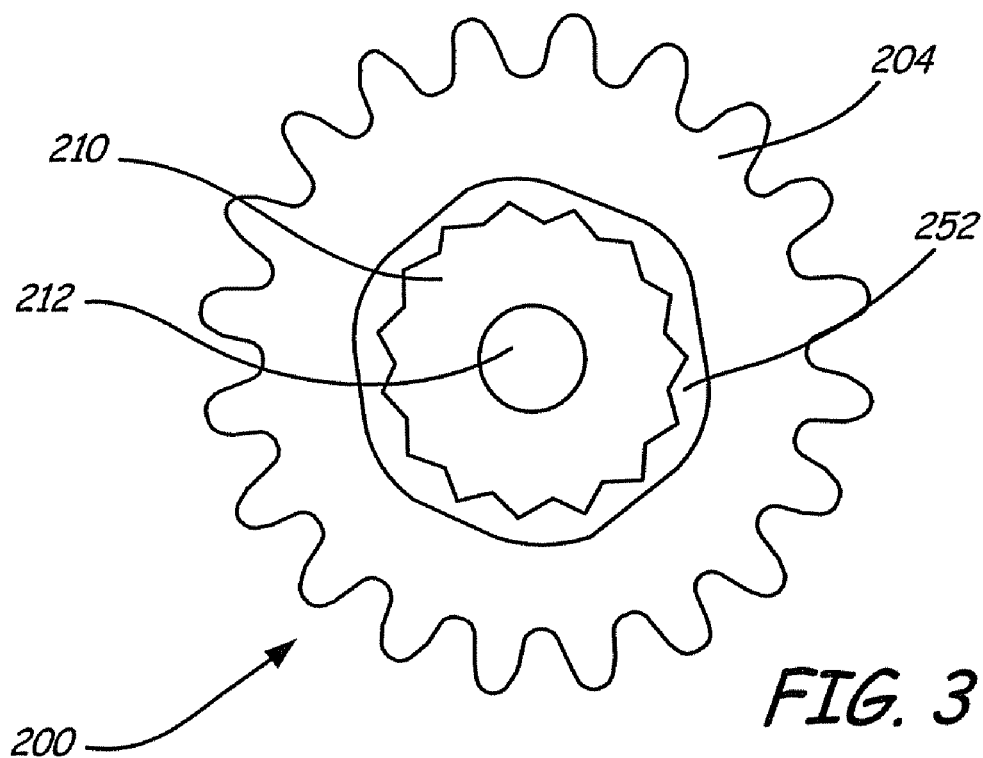
FIG. 3 is a bottom view of a gear assembly.

FIG. 3 is a bottom view of gear assembly 200. Gear assembly 200 includes OGAP bottom surface 204, IGAP 252, OGAP planar inner surface 210, and gear assembly orifice 212. In an embodiment, IGAP 252 and surface 210 are engaged securely. In an embodiment, OGAP 202 and IGAP 252 are engaged such that rotation from output shaft 12 is transferred from IGAP 252 to OGAP teeth surface 206.

Figure 4:
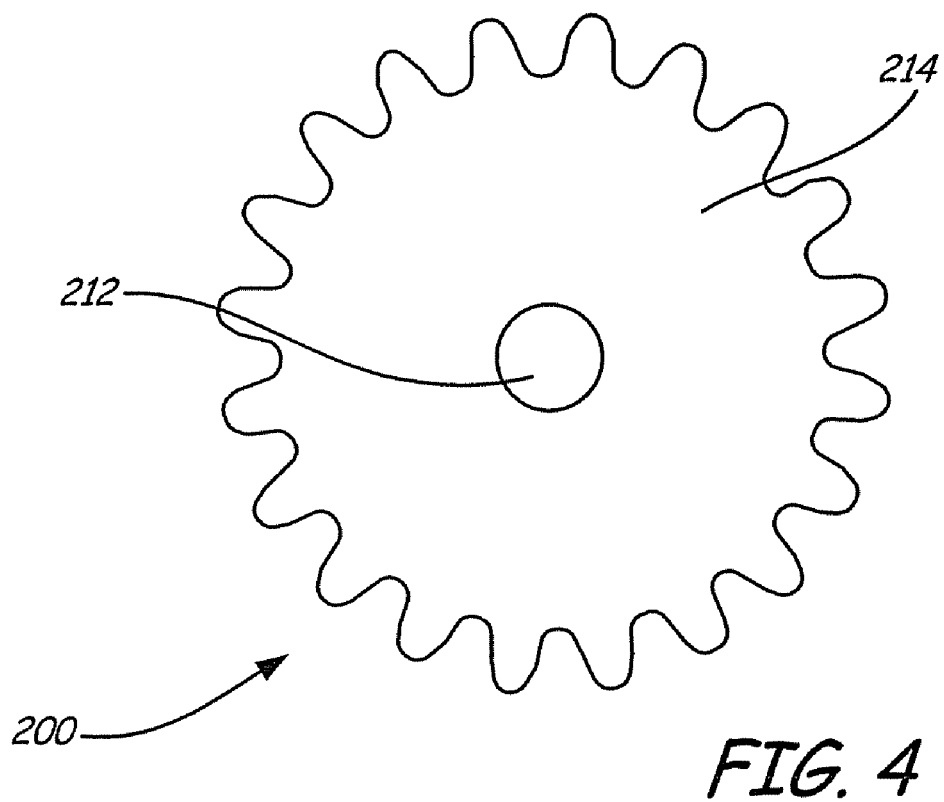
FIG. 4 is a top view of a gear assembly.

FIG. 4 is a top view of gear assembly 200. Gear assembly 200 includes gear assembly orifice 212 and gear assembly top surface 214. In an embodiment, gear assembly orifice 212 receives an attachment mechanism such that gear assembly 200 is secured to hobby servo 100. In one embodiment, gear assembly orifice 212 receives a screw that has a head with a larger diameter than orifice 212 such that the head of the screw rests on top surface 214. In that embodiment, the screw extends through orifice 212 and threads into the standard engagement inside servo output shaft orifice 14.

Figure 5:
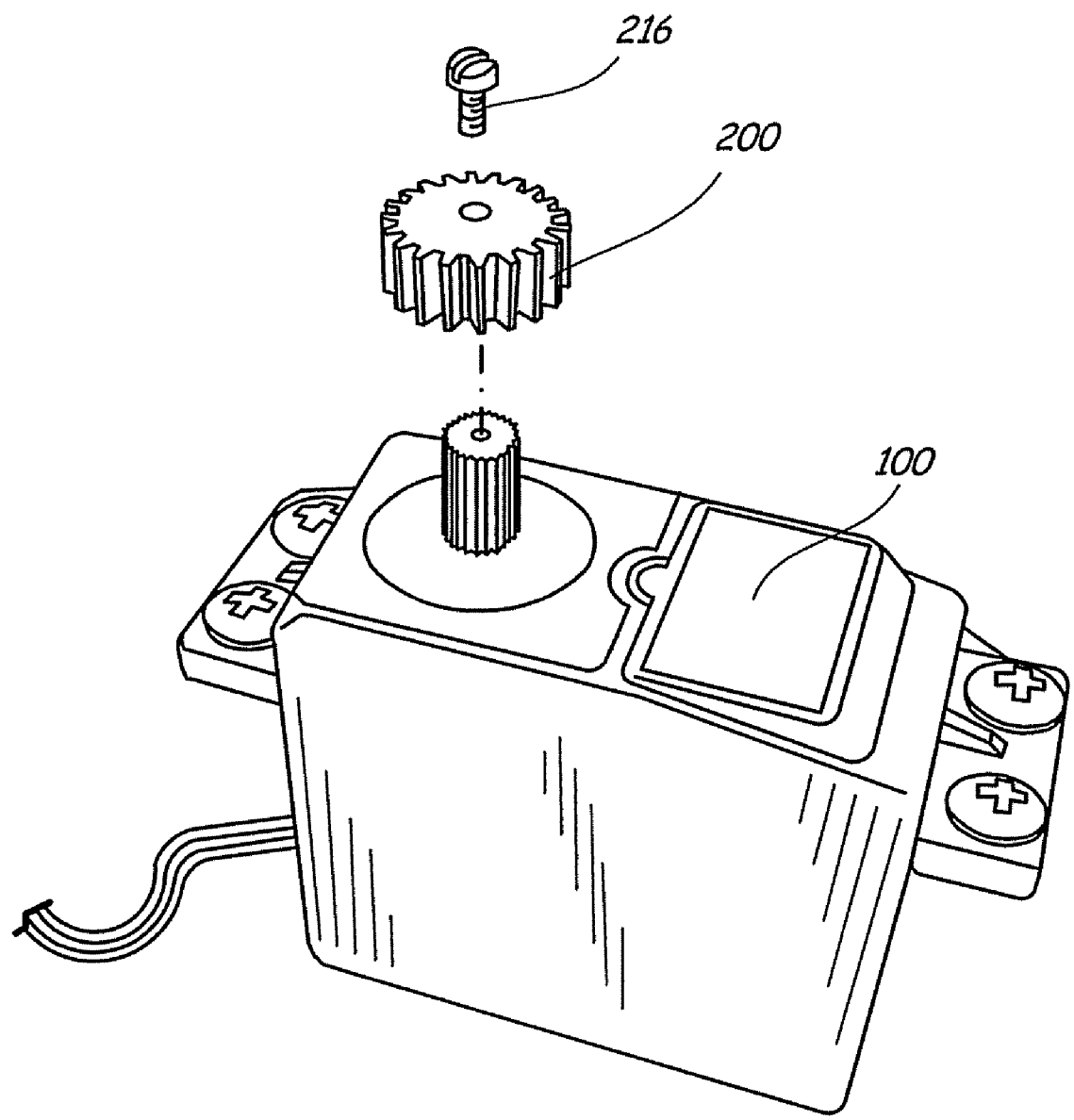
FIG. 5 is an exploded perspective view of a gear assembly and a hobby servo.

FIG. 5 is an exploded perspective view of gear assembly 200 and hobby servo 100. In an embodiment, gear assembly 200 is flushly engaged with hobby servo 100, and is secured to hobby servo 100 using an attachment mechanism such as a screw 216. In one embodiment, IGAP bottom surface 258 and OGAP bottom surface 204 (both shown in FIG. 2) flushly engage circular planar surface 15 (shown in FIG. 1). The attachment of gear assembly 200 to hobby servo 100 provides many useful features. Gear assembly 200 provides enhanced performance such as increased strength and durability. Gear assembly 200 supports greater loads on the servo than the servo could support alone. Gear assembly 200 also allows for items that cannot be directly attached to a hobby servo to be indirectly attached.

Embodiments of gear assembly 200 attach to every output shaft and engage any mechanical item. Embodiments of gear assembly 200 include an OGAP 202 and an IGAP 252 that are made from different materials. In an embodiment, the OGAP 202 material is chosen based at least partially upon the type of material or shape of the object that the teeth surface 206 engages. In another embodiment, the IGAP 252 material is chosen based at least partially upon the type of material or shape of output shaft 12. In another embodiment, OGAP 202 and IGAP 252 are made from the same material. In yet another embodiment, gear assembly 200 is one piece and does not have separate OGAP 202 and IGAP 252 parts.

Figure 6:
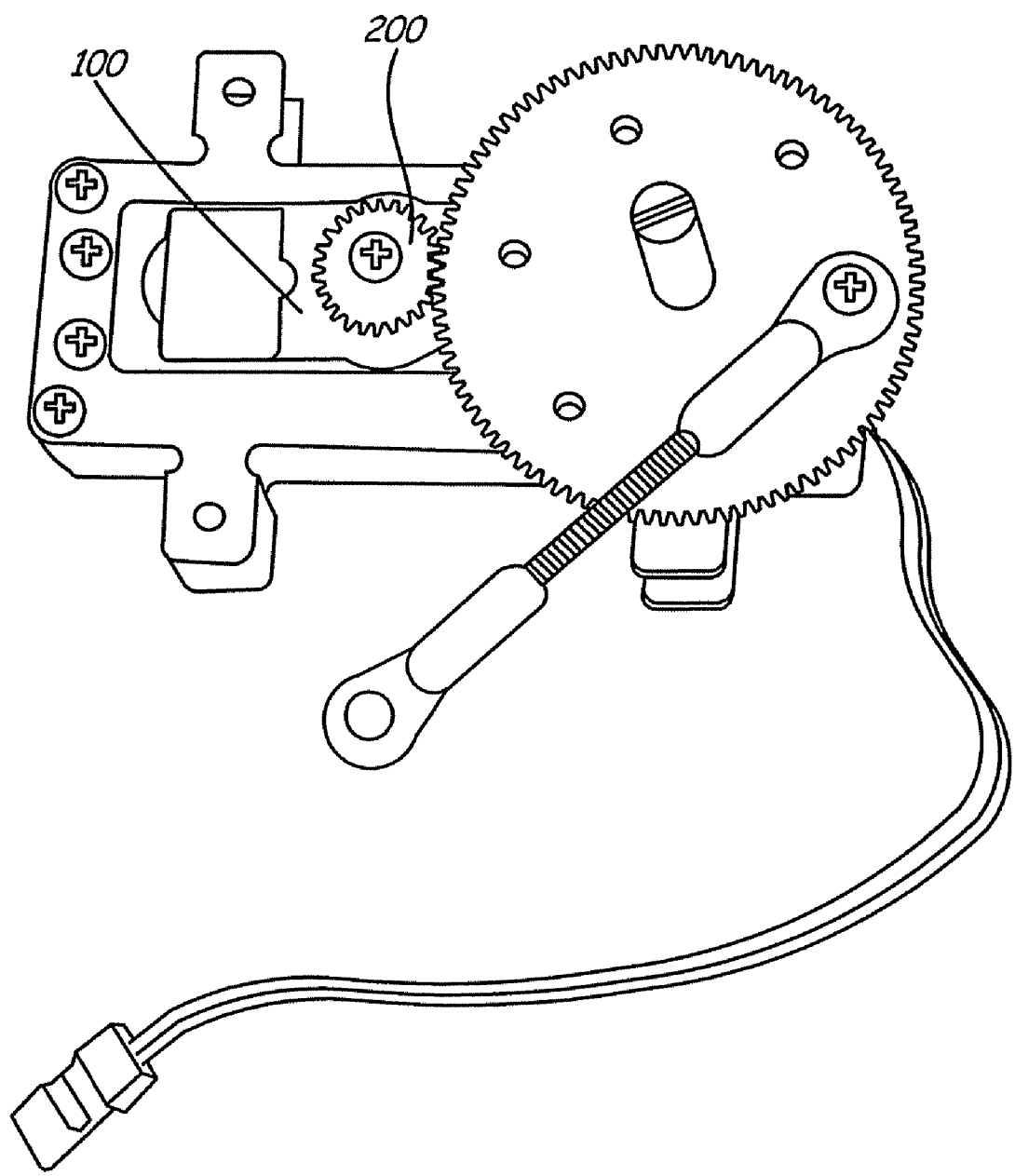
FIG. 6 is a perspective view of a gear assembly functionally engaging a larger gear.
Figure 7:
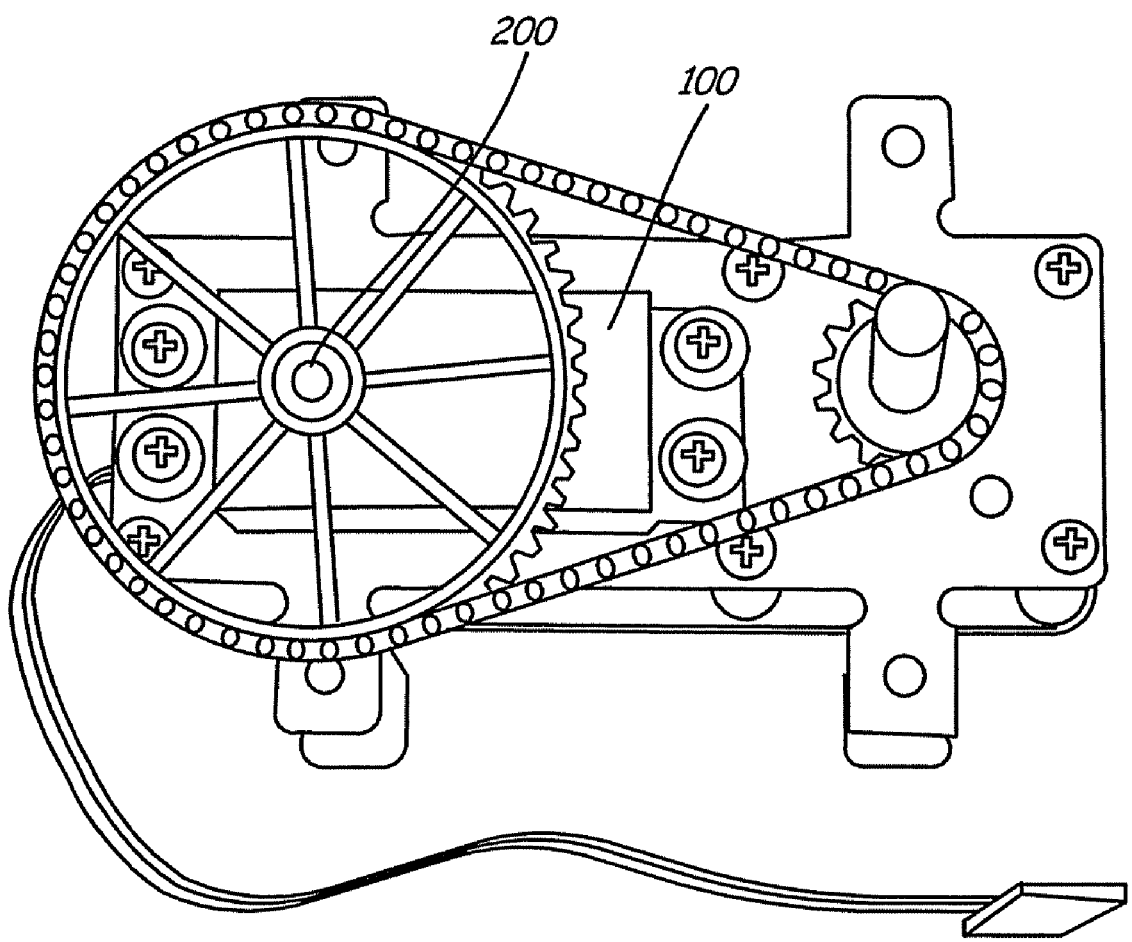
FIG. 7 is a perspective view of a gear assembly functionally engaging a chain.

FIGS. 6 and 7 both show illustrative uses of gear assembly 200. In FIG. 6, gear assembly 200 is a gear that is functionally engaging a larger gear. In FIG. 7, gear assembly 200 is a sprocket that is functionally engaging a chain to rotate a shaft. Gear assembly 200 of course is not limited to the applications or sizes shown in the figures. Embodiments of gear assembly 200 include all sizes and are used in a multitude of applications.

Although the mechanisms and gears for attachment to a hobby servo output shaft has been described with reference to particular embodiments, workers skilled in the art will recognize that changes may be made in form and detail without departing from the spirit and scope of the invention.

What is claimed is:

1. A hobby servo device comprising:
   a hobby servo motor having splined output shaft and a planar surface that is perpendicular to the output shaft, the splined output shaft having a top surface;
   a gear attachment mechanism having a top planar surface, a bottom planar surface, an inner surface, and an outer surface, the inner surface having teeth that engage the splined output shaft and that functionally couple the gear attachment mechanism to the splined output shaft, the outer surface having gear engaging teeth, the top surface of the gear attachment mechanism being in contact with the top surface of the hobby servo output shaft, the bottom surface of the gear attachment mechanism being flushly engaged to the hobby servo planar surface; and
   wherein a portion of the splines of the hobby servo splined output shaft, a portion of the teeth of the gear attachment mechanism inner surface, and a portion of the teeth of the gear attachment mechanism outer surface are within a common plane.

2. The device of claim 1 wherein the gear attachment mechanism top planar surface includes an aperture, and wherein the common plane and the hobby servo motor planar surface are parallel.

3. The device of claim 2 wherein the gear attachment mechanism is secured to the hobby servo motor using the aperture, and wherein the gear attachment mechanism comprises one piece such that the gear attachment mechanism inner surface teeth and the gear attachment mechanism outer surface teeth are formed by the one piece.

4. The device of claim 3 wherein a screw secures the gear attachment mechanism to the hobby servo motor, and wherein the portion of the splines of the hobby servo splined output shaft, the portion of the teeth of the gear attachment mechanism inner surface, and the portion of the teeth of the gear attachment mechanism outer surface are located between the hobby servo planar surface and the gear attachment mechanism top planar surface.

5. The device of claim 1 wherein the hobby servo output shaft has a rotational capacity of less than three hundred and sixty angular degrees, and wherein all of the splines of the hobby servo splined output shaft, all of the teeth of the gear attachment mechanism inner surface, and all of the teeth of the gear attachment mechanism outer surface are located between the hobby servo planar surface and the gear attachment mechanism top planar surface.

6. The device of claim 1 wherein the hobby servo output shaft is made from a synthetic material.

7. The device of claim 1 wherein the gear attachment mechanism is made from a metal.

8. A hobby servo device comprising:
   a hobby servo motor having a rotatable splined output shaft and a rotatable splined output shaft top;
   a gear attachment mechanism having an inner surface that engages the rotatable splined output shaft, a top surface that engages the rotatable splined output shaft top, and a gear-engaging outer surface;
   wherein the hobby servo motor rotatable output shaft, the gear attachment inner surface, and the gear attachment mechanism gear-engaging outer surface rotate at least partially in a same plane; and
   wherein a hobby servo coded input signal controls an angular position of the gear attachment mechanism.

9. The device of claim 8 wherein the same plane is between the hobby servo motor and the gear attachment mechanism top surface.

10. The device of claim 9 wherein the same plane is perpendicular to an axis of rotation of the hobby servo motor rotatable splined output shaft.

11. The device of claim 10 wherein the gear attachment mechanism comprises one piece such that the gear attachment mechanism inner surface and the gear attachment mechanism outer surface are formed by the one piece.

12. The device of claim 11 wherein the gear attachment mechanism is made of a metal.

13. The device of claim 11 wherein the gear attachment mechanism is made of a plastic.

14. A device for translating rotational motion produced by a hobby servo motor, wherein the hobby servo includes an output shaft, the device comprising:
   an inner surface;
   an outer surface;
   a plurality of hobby servo motor output shaft engaging structures extending from the inner surface;
   a plurality of gear engaging structures extending from the outer surface;
   a top surface that includes an aperture and that is perpendicular to the inner and the outer surfaces, the top surface aperture having a diameter that is smaller than the diameter of the hobby servo output shaft;
   a bottom surface that is perpendicular to the inner and the outer surfaces; and
   wherein the output shaft engaging structures and the gear engaging structures are at least partially coplanar in a plane that is between the top and the bottom surfaces.

15. The device of claim 14 wherein the top surface, the bottom surface, and the plane are parallel.

16. The device of claim 15 wherein the outer surface gear engaging structures cover an entire area of the outer surface that runs between the bottom surface and the top surface.

17. The device of claim 14 wherein the device is made from one piece.

18. The device of claim 14 wherein the device is made from more than one piece.

* * * * *